US006768615B2

(12) United States Patent
Liu

(10) Patent No.: US 6,768,615 B2
(45) Date of Patent: Jul. 27, 2004

(54) SPARK ELIMINATION CIRCUIT FOR CONTROLLING RELAY CONTACTS

(76) Inventor: Daniel Liu, 4F, No. 10, Alley 59, Lane 42, Min Chuan Road, Hsin Tien, Taipei Hsien (TW)

( * ) Notice: Subject to any disclaimer, the term of this patent is extended or adjusted under 35 U.S.C. 154(b) by 79 days.

(21) Appl. No.: 10/176,684

(22) Filed: Jun. 24, 2002

(65) Prior Publication Data

US 2003/0235017 A1 Dec. 25, 2003

(51) Int. Cl.[7] .................................................. H02H 3/00
(52) U.S. Cl. ........................................... 361/2; 361/160
(58) Field of Search ........................... 361/2, 160, 152, 361/187

(56) References Cited

U.S. PATENT DOCUMENTS 5,267,120 A * 11/1993 Graff et al. ................. 361/185
6,233,132 B1 * 5/2001 Jenski ........................ 361/160

* cited by examiner

*Primary Examiner*—Brian Sircus
*Assistant Examiner*—Boris Benenson
(74) *Attorney, Agent, or Firm*—Rosenberg, Klein & Lee

(57) ABSTRACT

A relay control circuit is connected between a power source supplying an alternate current and a load to which the alternate current is supplied. The relay control circuit includes contacts for conducting/cutting off the alternate current supplied from the power source to the load. A first zero-crossing detection circuit is connected to the power source and generating a first zero-crossing signal to a control unit having a memory unit storing a time delay parameter. The control unit issues a control signal to energize a coil for actuating the contacts at a time point that leads the zero crossing point of the alternate current a time period equal to the time delay parameter whereby the contacts are actually actuated at a time point corresponding to the zero-crossing point. A second zero-crossing detection circuit is coupled to the load and generates a second zero-crossing signal. In case of deterioration of the performance of the relay, a difference exists between the time of detection of the second zero-crossing signal and the time point of the time delay parameter after the control signal. The difference is used to correct the time delay parameter.

11 Claims, 10 Drawing Sheets

SPARK ELIMINATION CIRCUIT FOR CONTROLLING RELAY CONTACTS

BACKGROUND OF THE INVENTION

1. Field of the Invention

The present invention relates generally to a relay control circuit, and in particular to a relay control circuit capable to suppress sparking caused by instant engagement between contacts of the relay.

2. Description of the Prior Art

Electromagnetic relays have been widely used in controlling electrical appliances. A relay comprises a casing in which a coil is mounted. The coil can be activated/deactivated to close/open mechanical contacts of the relay for supplying/cutting off power to the electrical appliances.

Although newly-developed devices, such as SCR and TRIAC have replaced the relays in some of the applications thereof, the relays are still prevailing in certain applications due to theirs low cost and easy operation.

A disadvantage that the relays commonly suffer is the sparking caused at the instant when the contacts of the relays get into engagement with each other or when the engagement is broken. The sparking causes noises and reduces the service life of the relays.

It is thus desired to provide a relay control circuit capable of overcoming the above problem.

SUMMARY OF THE INVENTION

An object of the present invention is thus to provide a relay control circuit that is capable to suppress sparking caused in the operation thereof.

Another object of the present invention is to provide a relay control circuit that is capable to compensate/correct performance problem caused by aging/deterioration in suppressing sparking.

To achieve the above objects, in accordance with the present invention, there is provided a relay control circuit connected between a power source supplying an alternate current having a voltage and a load to which the alternate current is supplied. The relay control circuit comprises a pair of contacts for conducting/cutting off the alternate current supplied from the power source to the load. The relay control circuit comprises a first zero-crossing detection circuit connected to the power source and generating a first zero-crossing signal to a control unit having a memory unit storing a time delay parameter. The control unit issues a control signal to a driving circuit for energizing a coil to actuate the contacts at a time point that leads the zero crossing point of the alternate current a time period equal to the time delay parameter whereby the contacts are actually actuated at a time point corresponding to the zero-crossing point. A second zero-crossing detection circuit is coupled to the load and generates a second zero-crossing signal. Theoretically, the second zero-crossing signal is received by the control unit at the instant corresponding to the time delay parameter after the control signal is issued by the control unit. In case of deterioration of the performance of the relay control circuit, a difference exists between the time of detection of the second zero-crossing signal and the time point of the time delay parameter after the control signal. The difference is used to correct the time delay parameter. The corrected parameter is stored in the memory unit for further use in actuating the contacts.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
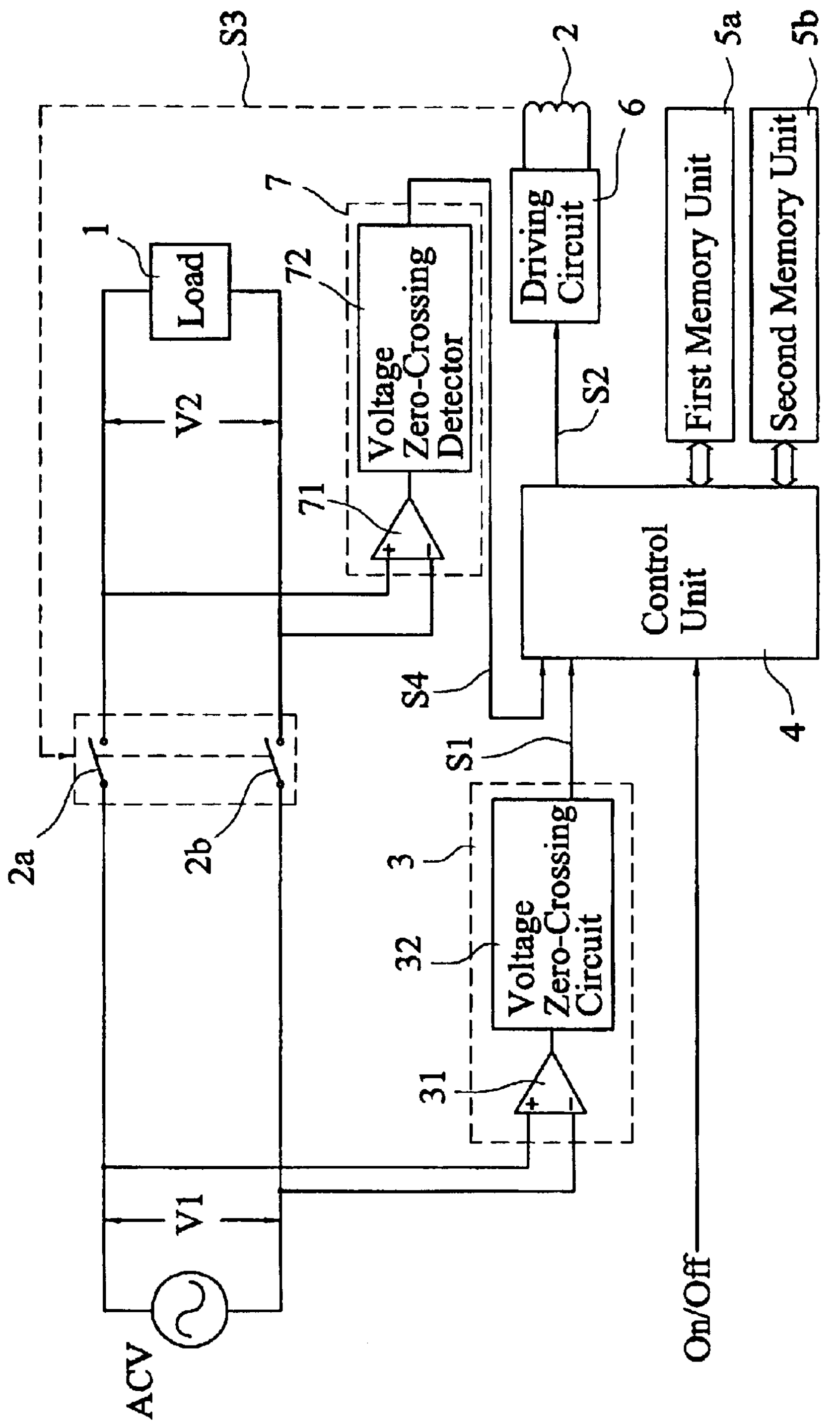
FIG. 1 is a circuit diagram of a relay control circuit in accordance with a first embodiment of the present invention connecting a load to a power source of alternate current.

With reference to the drawings and in particular to FIG. 1, a relay control circuit in accordance with the present invention is arranged between a power source ACV and an electrical load 1 to control power supplied to the load 1 in manner to substantially eliminate sparking caused by instantaneous engagement of the mechanical contacts 2*a*, 2*b*.

The relay control circuit of the present invention comprises a power side voltage detection device 3 consisting of a power side voltage detector 31 and a power side voltage zero-crossing detector 32. The power side voltage detector 31 of the power side voltage detection device 3 is connected across the power source ACV whereby each time when a voltage signal V1 of the power source ACV crosses zero point V0, a first zero-crossing signal S1 is generated and applied to a control unit 4.

The control unit 4 comprises first and second memory units 5*a*, 5*b* respectively storing a turn-on time delay parameter t-on (first time delay parameter) and a turn-off time delay parameter t-off (second time delay parameter) for closing and opening the contacts 2*a*, 2*b*. The first time delay parameter t-on represents in value the characteristic time lag between when an "ON" command is sent to the coil of the relay, namely when the relay is actuated, and when the contacts 2*a*, 2*b* of the relay actually closed in response. The second time delay parameter t-off represents in value the characteristic time lag between when an "OFF" command is sent to the coil of the relay, namely when the relay is de-activated, and when the contacts of the relay actually open in response.

Figure 2:
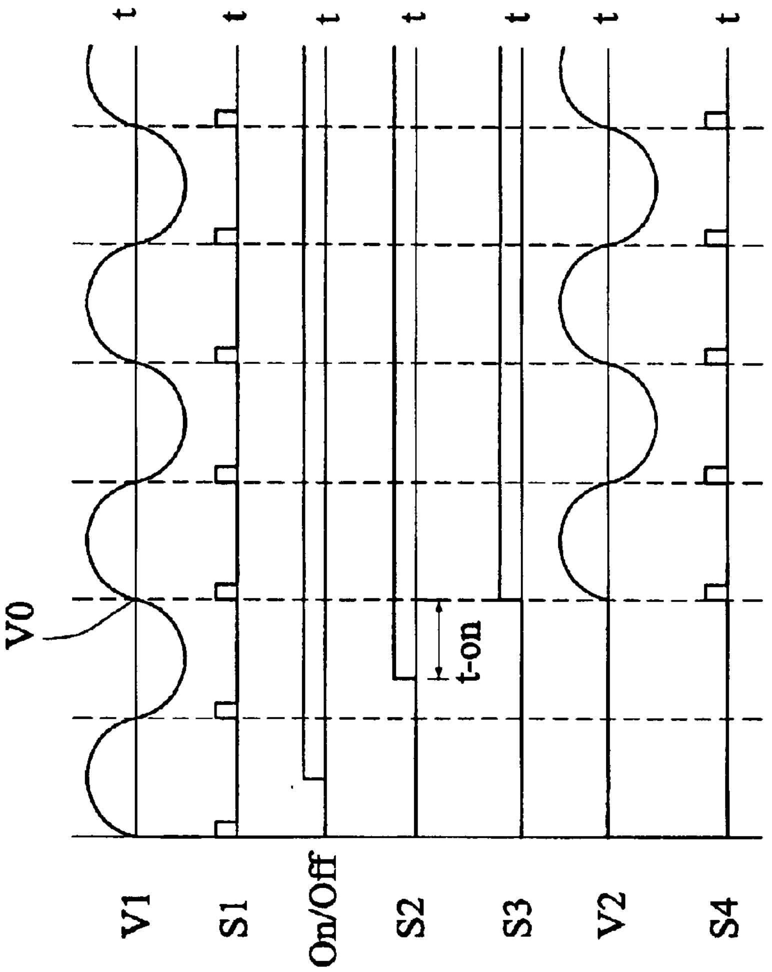
FIG. 2 is a waveform diagram showing waveforms of signals taken in the relay control circuit of FIG. 1 in a contact-closing operation.

Also referring to FIG. 2, in a contact-closing operation, when the "ON" command is received by the control unit 4 from an ON/OFF signal, such as from a switch, the control unit 4 retrieves the first time delay parameter t-on from the first memory unit 5*a*. The control unit 4 issues a signal S2 to a driving circuit 6 which closes the contacts 2*a*, 2*b* via a coil 2 issuing an actuating signal S3 at a time based on calculation made on the first time delay parameter t-on, as well as the first zero-crossing signal S1, whereby the contacts 2*a*, 2*b* are actually closed at a time when the voltage signal V1 crosses the zero point or within an acceptable time margin from the zero-crossing point. In the embodiment illustrated, the signal S2 is issued at a time of t-on before a negative half of a cycle of the voltage signal V1 crosses the zero point indicated by V0 in FIG. 2. By means of issuing the signal S2 to the driving circuit 6 at a time of t-on before the zero-crossing point V0 of the voltage signal V1, the contacts 2*a*, 2*b* that are actuated by the coil 2 of the driving circuit 6 are closed at a time substantially corresponding to the zero-crossing point V0 of the voltage signal V1. Since the contacts 2*a*, 2*b* are closed at a time substantially corresponding to the zero-crossing point V0 of the voltage signal V1, substantially no current flowing through the contacts 2*a*, 2*b* when the contacts 2*a*, 2*b* are closed. Thus, sparking is effectively suppressed.

As shown in FIG. 2, the voltage signal V2 that is applied to the load 1 starts at a time substantially corresponding to the zero-crossing point V0 of the voltage signal V1.

Figure 3:
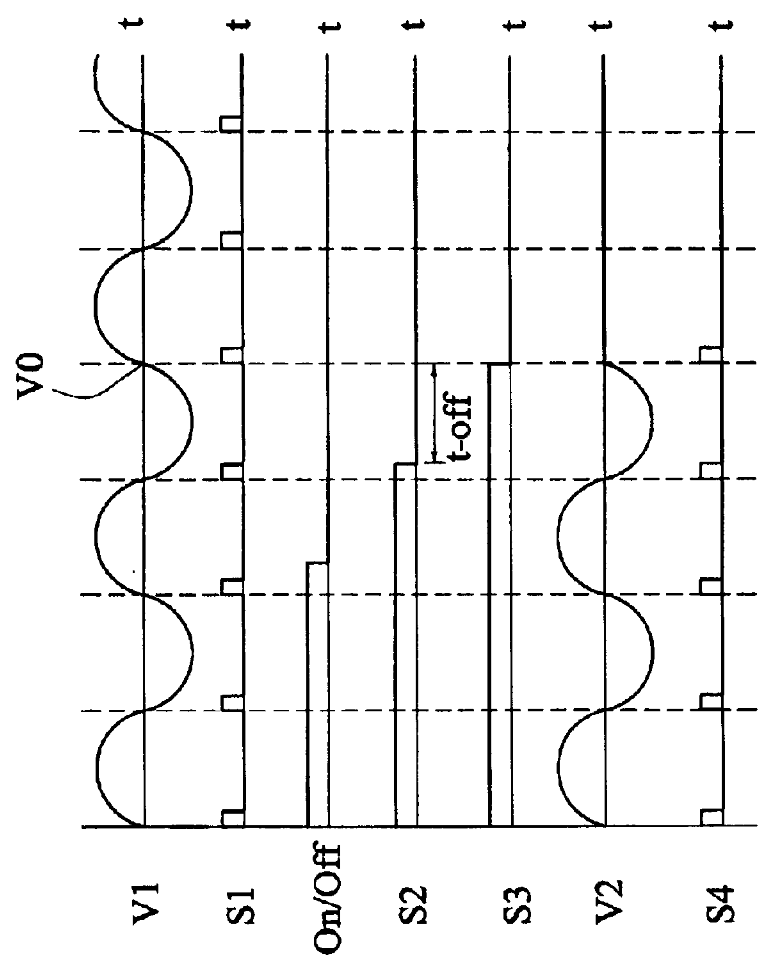
FIG. 3 is a waveform diagram showing waveforms of signals taken in the relay control circuit of FIG. 1 in a contact-opening operation.

Also referring to FIG. 3, in a contact-opening operation, when the control unit 4 receives an OFF command from the ON/OFF signal, the control unit 4 retrieves the second time delay parameter t-off from the second memory unit 5*b*. The control unit 4 performs calculation based on the second time delay parameter t-off and the first zero-crossing signal S1 from the power side voltage detection device 3 to cut off the signal S2 at a time of t-off, or within an acceptable time margin of that time, before a zero-crossing point V0 whereby the driving circuit 6 and the coil 2 are de-activated which in turn open the contacts 2*a*, 2*b* after a time delay of t-off as indicated by signal S3 of FIG. 3. Thus, the contacts 2*a*, 2*b* are actually opened at a time point substantially corresponding to the zero-crossing point V0 of the voltage signal V1 and then the voltage signal V2 ends at the zero-crossing point V0. Since the contacts 2*a*, 2*b* are opened at a time substantially corresponding to the zero-crossing point V0 of the voltage signal V1, substantially no current flowing through the contacts 2*a*, 2*b* at the moment when the contacts 2*a*, 2*b* are being opened. Thus, sparking occurring in opening the contacts 2*a*, 2*b* is effectively suppressed.

Figure 4:
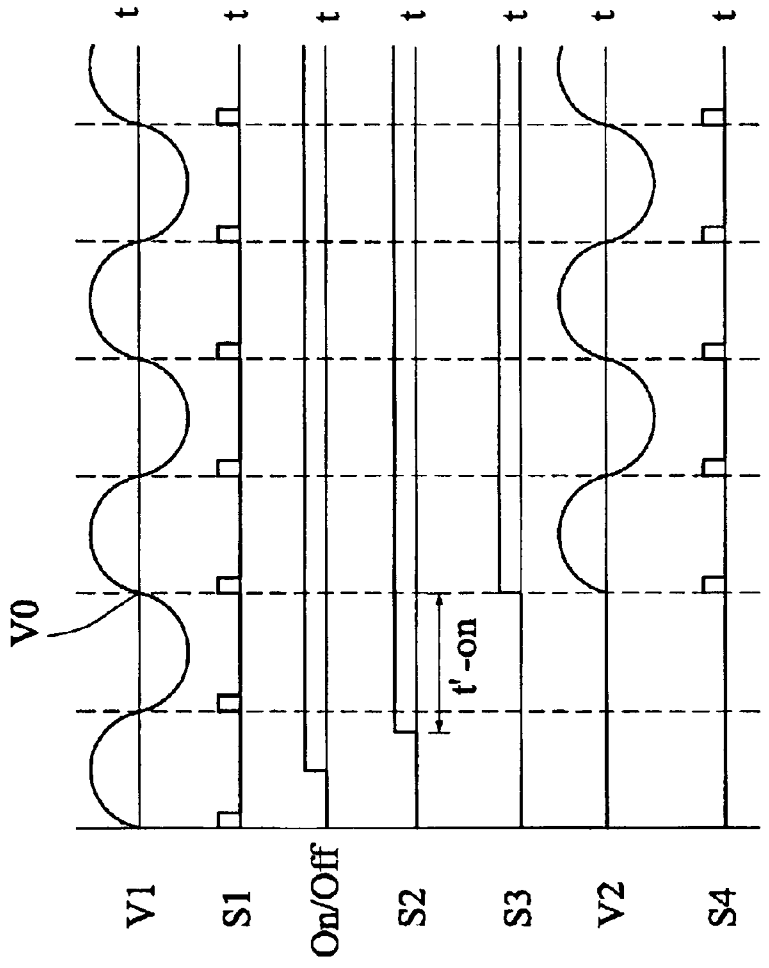
FIG. 4 is a waveform diagram showing waveforms of signals taken in the relay control circuit of FIG. 1 in a contact-closing operation, after turn-on time delay correction.

Referring back to FIGS. 1 and 2 and further referring to FIG. 4, a load side voltage detection device 7 is connected in parallel to the load 1. The load side voltage detection device 7 comprises a load side voltage detector 71 connected to the load 1 for detecting the voltage signal V2 and a load side voltage zero-crossing detector 72 for issuing a second zero-crossing signal S4 of the voltage V2 to the control unit 4. Theoretically, when an ON command is issued to the control unit 4, the second zero-crossing signal S4 will be detected by the control unit 4 at a time point of t-on after the signal S2 is issued by the control unit 4.

Not detecting the second zero-crossing signal S4 in time by the control unit 4 indicates that the first time delay parameter t-on whose value is initially stored in the first memory unit 5*a* is no longer correct. This may be caused by incorrect input of the first time delay parameter value t-on or deterioration of the performance of the relay control circuit, leading to elongation of the relay time lag. Based on the difference between the zero-crossing point V0 of the voltage V1 and the signal S4, the control unit 4 calculates a new time delay parameter t'-on whose value more accurately represents the relay time lag. The new time delay parameter t'-on is then stored in the first memory unit 5*a* to replace the original time delay parameter t-on. Once the time delay parameter t-on is corrected, then the control unit 4 uses the corrected parameter value t'-on to control the operation of the relay control circuit as shown in FIG. 4.

Figure 5:
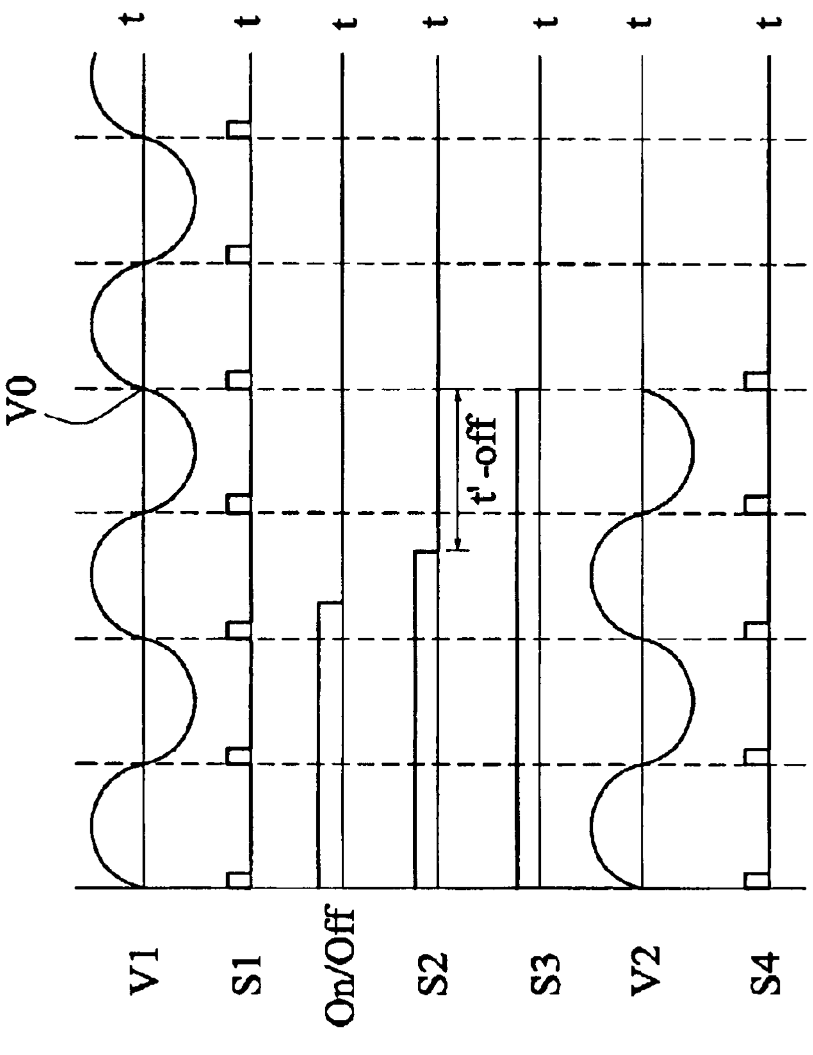
FIG. 5 is a waveform diagram showing waveforms of corrected signals taken in the relay control circuit of FIG. 1 in a contact-opening operation, after turn-off time delay correction.

Referring to FIG. 5, similarly, when the second time delay parameter t-off is no longer correct in value due to any reason, a correction can be made by comparing the second zero-crossing signal S4 with the zero-crossing point V0 of the voltage signal V1 and a new time delay parameter f-off is obtained to represent in value the corresponding relay time lag. The new parameter f-off is stored in the second memory unit 5*b* and replaces the original parameter value t-off. Once the time delay parameter t-off is corrected to t'-off, the control unit 4 uses the corrected parameter t'-off to control the operation of the relay control circuit.

Figure 6:
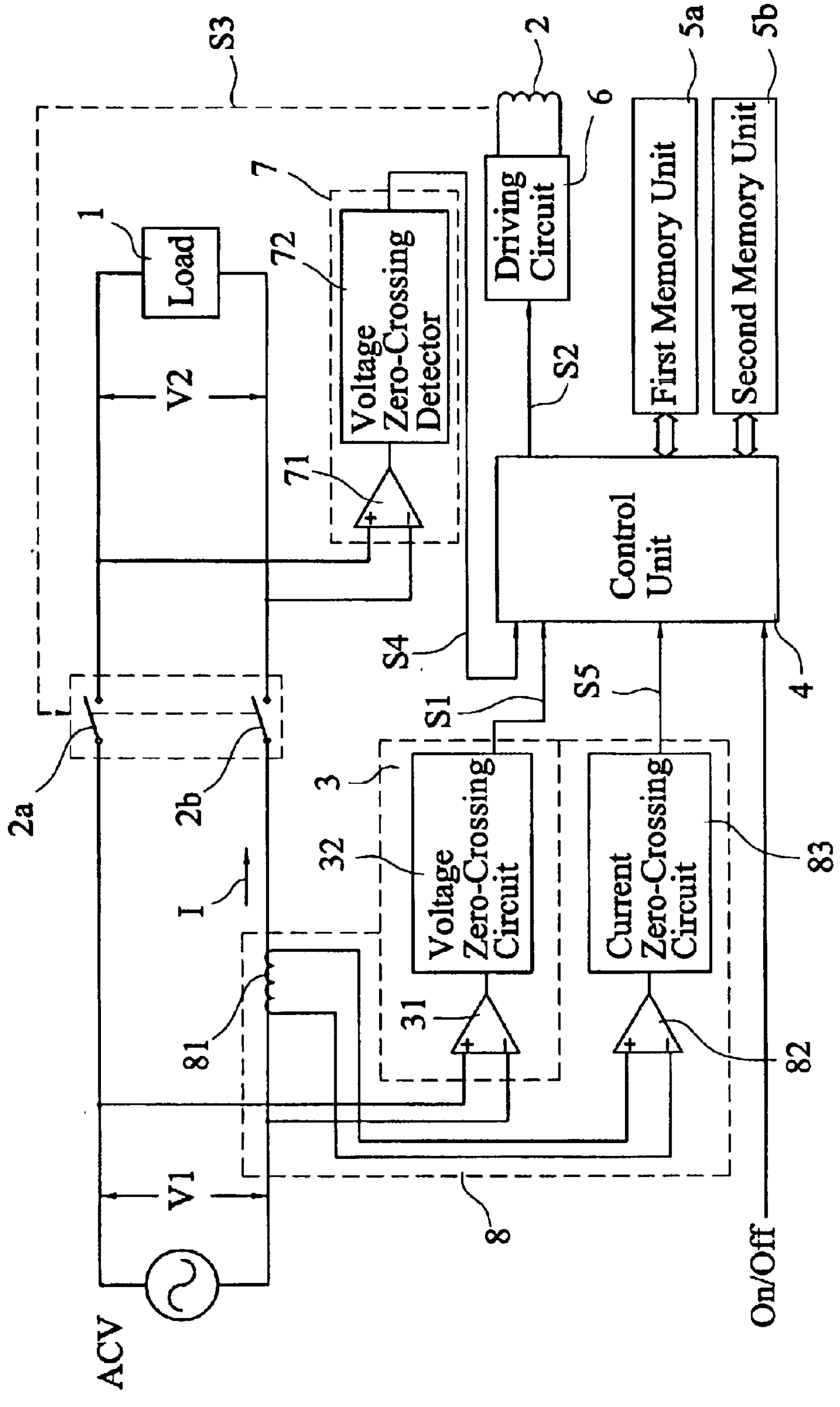
FIG. 6 is a circuit diagram of a relay control circuit in accordance with a second embodiment of the present invention connecting a load to a power source of alternate current.
Figure 7:
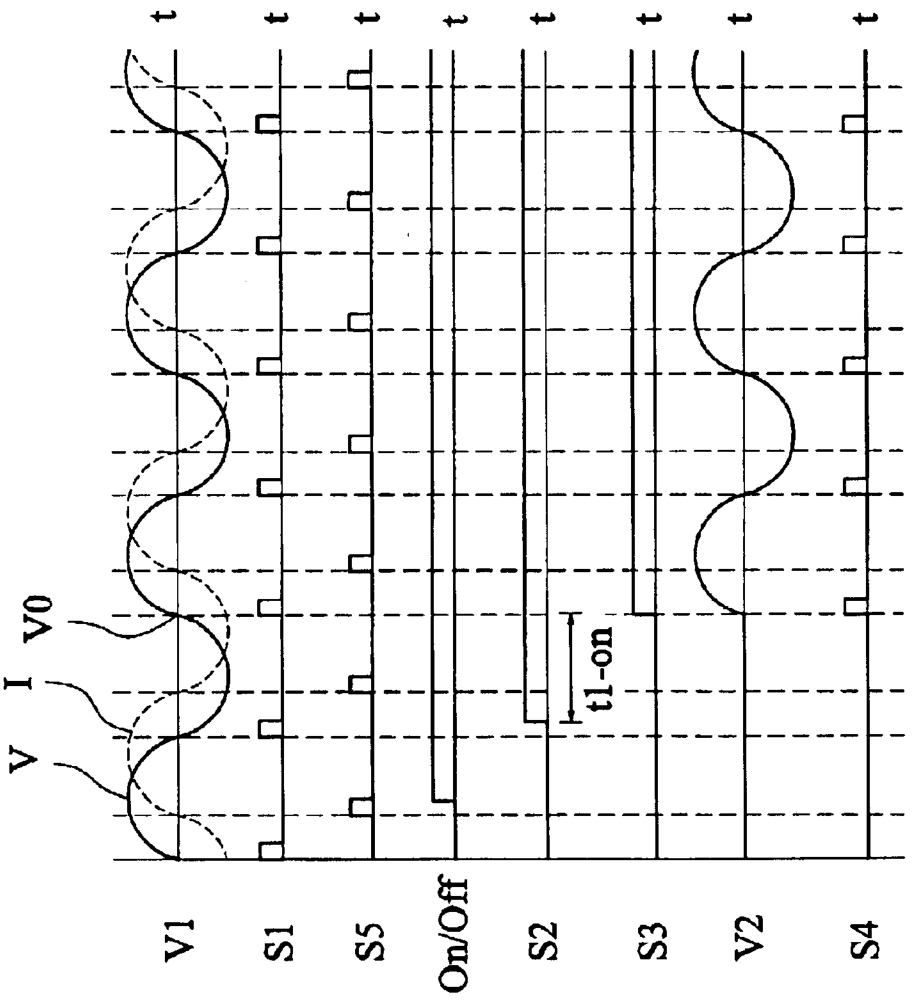
FIG. 7 is a waveform diagram showing waveforms of signals taken in the relay control circuit of FIG. 6 in a contact-closing operation.
Figure 8:
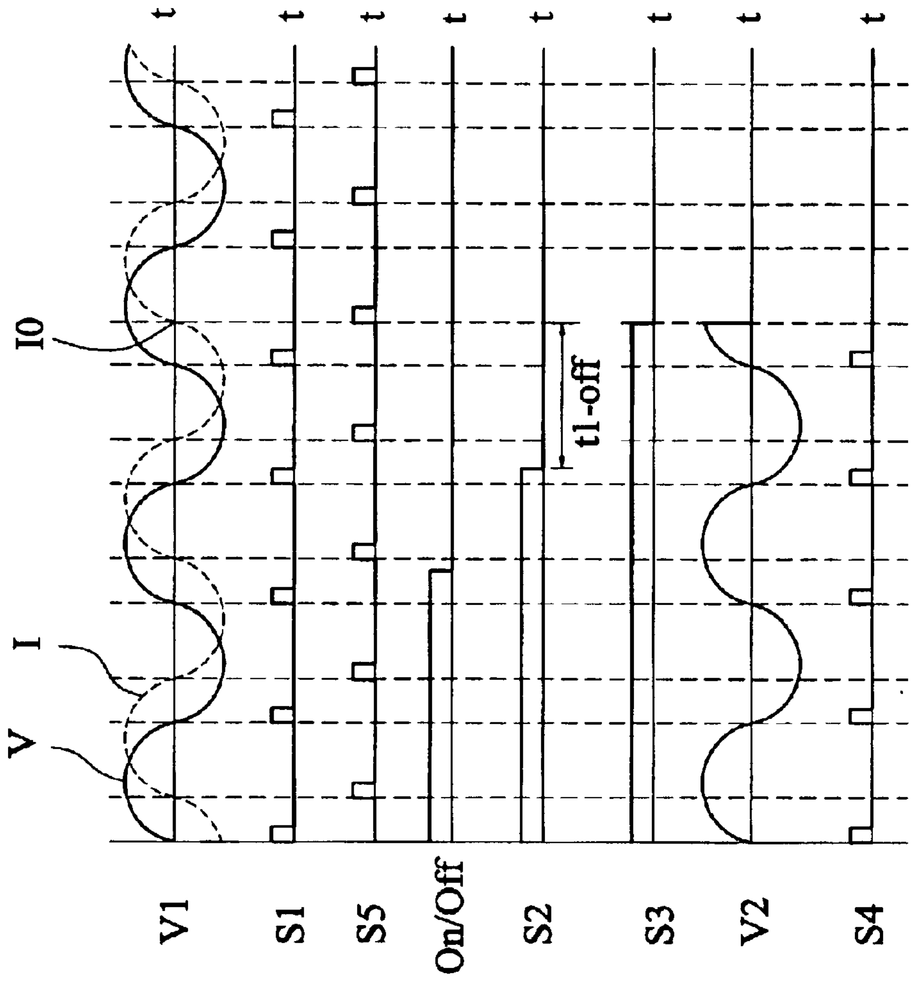
FIG. 8 is a waveform diagram showing waveforms of signals taken in the relay control circuit of FIG. 6 in a contact-opening operation.

FIG. 6 shows a second embodiment of the relay control circuit in accordance with the present invention. FIG. 7 is a waveform diagram showing waveforms of signals taken in the relay control circuit of FIG. 6 in a contact-closing operation. FIG. 8 is a waveform diagram showing waveforms of signals taken in the relay control circuit of FIG. 6 in a contact-opening operation.

In case that the load 1 is an inductive load, such as an induction motor, the current signal as indicated by reference letter I in FIG. 7 has a phase lag with respect to the voltage signal indicated by reference letter V. To detect the zero-crossing point of the current signal I, besides the power side voltage detection device 3 that is used to detect the voltage signal V, the second embodiment of the present invention further includes a power side current detection device 8, as shown in FIG. 6.

The power side current detection device 8 comprises a current detector 81, such as a resistor, connected in series between the power source ACV and the load 1 to detect the current signal I. A comparator 82 has a positive input and a negative input electrically connected across the current detector 81. The output end of the comparator 82 is connected to a power side current zero-crossing circuit 83. So, in such arrangement, the power side current zero-crossing detector 83 is capable of generating a current zero-crossing signal S5 indicating a current zero-crossing point 10 each time a zero-crossing condition is made by the current signal I. The current zero-crossing signal S5 is then applied to the control unit 4.

Also referring to FIG. 7, in a contact-closing operation, the control unit 4 receives an ON command and retrieves a third time delay parameter t1-on from a first memory unit 5*a* and determines the time when to issue a signal S2 to a driving circuit 6 which in turn energizes a coil 2 to issue a signal S3 for actuating the contacts 2*a*, 2*b*. Due to the third time delay parameter t1-on, the contacts 2*a*, 2*b* may be actually actuated at a time substantially corresponding to a voltage zero-crossing point V0 of the voltage signal V1.

Further referring to FIG. 8, in a contact-opening operation, the control unit 4 receives an OFF command and retrieves a fourth time delay parameter t1-off from a second memory unit 5*b*. The control unit 5*b* determines the time when to issue a signal S2 to the driving circuit 6 for energizing the coil 2 to issue a signal S3 that opens the contacts 2*a*, 2*b*. Due to the fourth time delay parameter t1-off, the contacts 2*a*, 2*b* are actually opened at a time substantially corresponding to a current zero-crossing point 10 of the current signal I.

Figure 9:
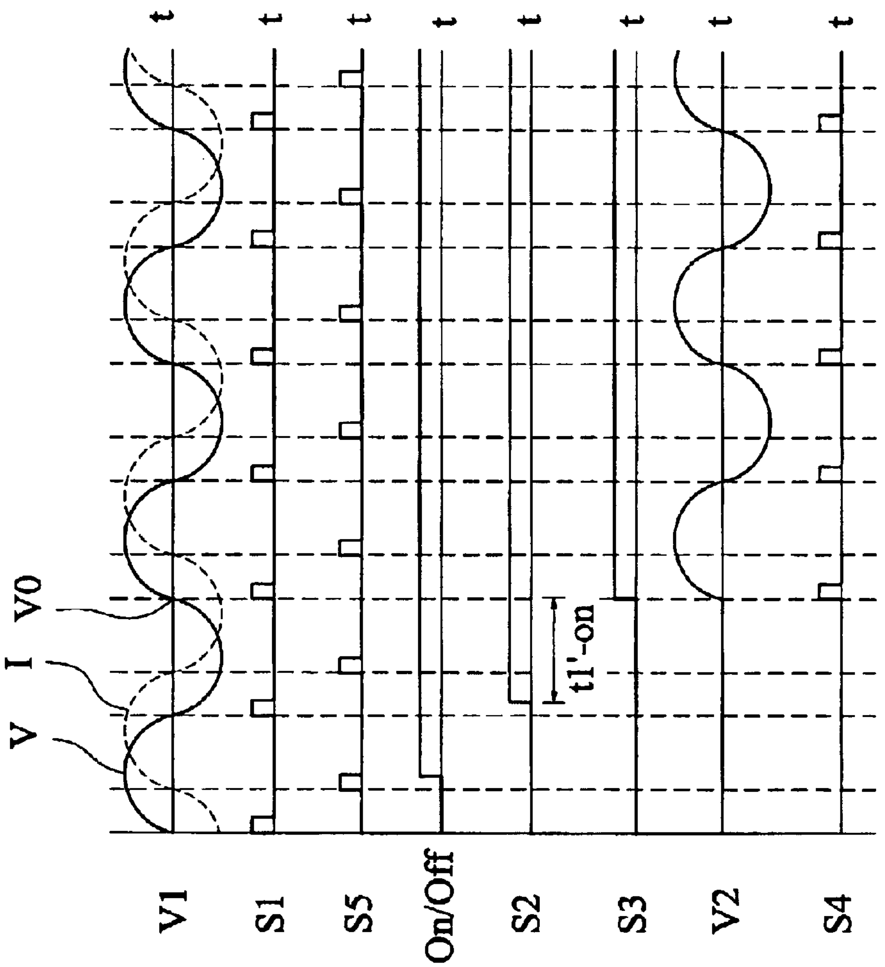
FIG. 9 is a waveform diagram showing waveforms of corrected signals taken in the relay control circuit of FIG. 6 in a contact-closing operation, after turn-on time delay correction.

Similar to the first embodiment, the load side voltage detection device 7 that comprises a load side voltage detector 71 and a load side voltage zero-crossing detector 72 is coupled to the load 1. As shown in FIG. 9, the load side voltage detection device 7 detects the voltage signal V2 and generates a voltage zero-crossing signal S4 to the control unit 4. By comparing the zero-crossing signal S4 with the signal S1, a corrected time delay parameter t1'-on can be obtained. The corrected time delay parameter t1'-on is stored in the first memory unit 5*a* and replace the original third time delay parameter t1-on. The corrected time delay parameter t1'-on may then be used in future operation of the relay control circuit.

Figure 10:
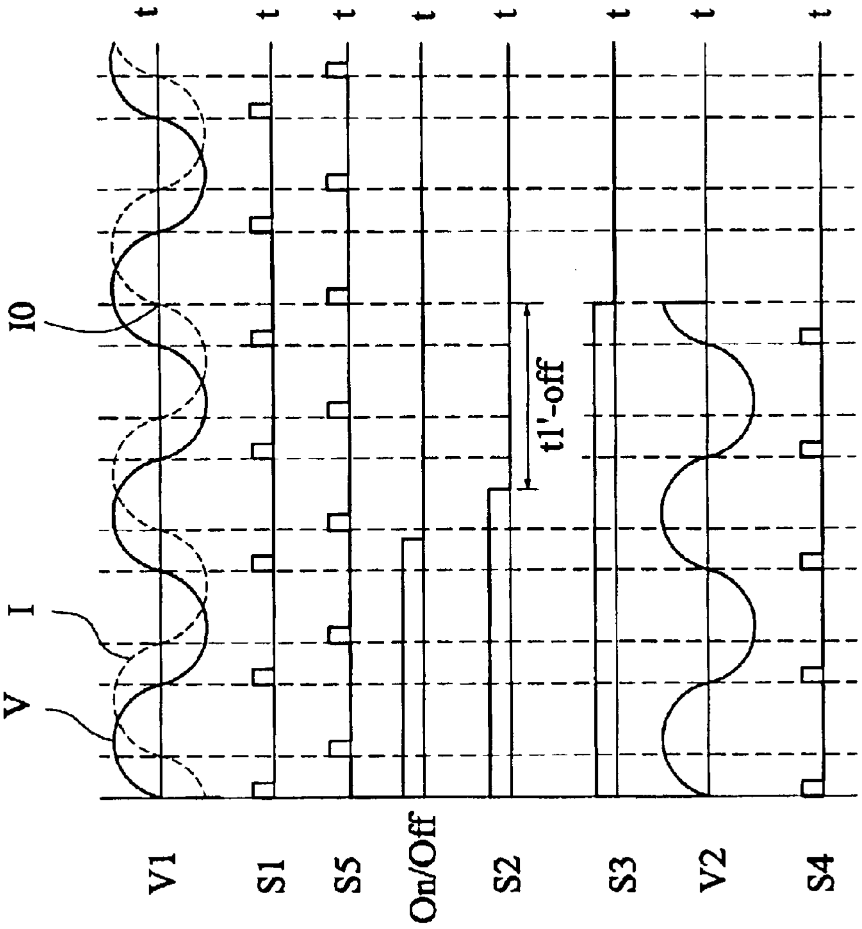
FIG. 10 is a waveform diagram showing waveforms of corrected signals taken in the relay control circuit of FIG. 6 in a contact-opening operation, after turn-off time delay correction.

Referring to FIG. 10, when the fourth time delay parameter t1'-off is incorrect due to any reasons, a correction can be made by comparing the zero-crossing signal S4 with the voltage zero-crossing point V0 of the voltage signal V1, namely the zero-crossing signal S1, and a corrected time delay parameter t1'-off is obtained. The corrected parameter t1'-off is stored in the second memory unit 5*b* and replace the original forth time delay parameter t1-off. Once the time delay parameter t1-off is corrected to t1'-off, the control unit 4 uses the corrected parameter t1'-off to control the operation of the relay control circuit.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A relay control circuit for connecting a power source supplying an alternating current having a power voltage and a load, the relay control circuit comprising:

a relay provided with a coil and at least one contact, the contact being operable between a closed operational position where the alternating current is allowed to pass to the load and an open operational position where the supply of the alternating current to the load is cut off, the contact being actuated responsive to energization of the coil, the relay having in operation at least one characteristic time lag;

a control unit operable to energize the coil of the relay responsive to a received turn-on or turn-off switch signal;

a time delay parameter storage means connected to the control unit and storing a time delay parameter, the time delay parameter corresponding in value to the time lag; and, a first voltage detection device for detecting a voltage zero-crossing point of the power voltage and generating a first voltage zero-crossing signal to the control unit;

wherein the control unit is operable to control energization of the coil based upon the time delay parameter to actuate a transition between the operational positions of the contact in substantially time-aligned manner relative to the first voltage zero-crossing signal, whereby the contact is actually operated at a time that the power voltage is substantially zero in value; and, wherein the control unit is operable to update the time delay parameter in value based upon a measurement of the power voltage at a load-side point relative to the contact.

2. The relay control circuit as claimed in claim 1, wherein the first voltage detection device comprises a voltage detector connected across the power source for detecting the power voltage and a voltage zero-crossing detector for detecting the voltage zero-crossing point of the power voltage.

3. The relay control circuit as claimed in claim 1, further comprising a second voltage detection device for detecting a voltage zero-crossing point for the power voltage as measured at the load-side point and generating a second voltage zero-crossing signal to the control unit for generation of an updated time delay parameter indicative of the time lag, the updated time delay parameter being stored in the memory to replace the initial time delay parameter.

4. The relay control circuit as claimed in claim 3, wherein the second voltage detection device comprises a voltage detector connected across the load and a voltage zero-crossing detector for detecting the voltage zero-crossing point of the second voltage thereacross.

5. The relay control circuit as claimed in claim 1, wherein the time delay parameter storage means comprises:

a first memory unit for storing a turn-on time delay parameter corresponding in value to the time lag between a turn-on switch signal being sent to the coil of the relay and the contact of the relay closing in response and;

a second memory unit for storing a turn-off time delay parameter corresponding in value to the time lag between a turn-off switch signal being sent to the coil of the relay and the contact of the relay opening in response.

6. A relay control circuit for connecting a power source supplying an alternating current power voltage and a load, the relay control circuit comprising:

a relay provided with a coil and at least one contact, the contact being operable between a closed position where the alternating current is allowed to pass to the load and an open position where the supply of the alternating current to the load is cut off, the contact being actuated responsive to energization of the coil, the relay having in operation at least one characteristic;

a control unit operable to energize the coil of the relay responsive to a received turn-on or turn-off switch signal;

a time delay parameter storage means connected to the control unit and storing at least first and second time delay parameter corresponding in value to the time lag for first and second operational states of the relay;

a first voltage detection device for detecting a voltage zero-crossing point of the power voltage and generating a first voltage zero-crossing signal to the control unit; and, a current detection device for detecting a current zero-crossing point of the alternating current and generating a current zero-crossing signal to the control unit;

wherein the control unit is operable to control energization of the coil based upon the first time delay parameter to actuate a transition of when the contact from the open position to the closed position in substantially time-aligned manner relative to the first voltage zero-crossing signal, whereby the contacts is actually closed at a time that the power source voltage is substantially zero in value;

wherein the control unit is operable to control energization of the coil based upon the second time delay parameter to actuate a transition of the contact from the closed position to the open position in substantially time-aligned manner relative to the current zero-crossing signal, whereby the contacts is actually opened at a time that the power source current is substantially zero in value; and, wherein the control unit is operable to update at least the first time delay parameter in value based upon a measurement of the power voltage at a load-side point relative to the contact.

7. The relay control circuit as claimed in claim 6, wherein the first voltage detection device comprises a voltage detector connected across the power source for detecting the power voltage and a voltage zero-crossing detector for detecting the voltage zero-crossing point of the power voltage.

8. The relay control circuit as claimed in claim 6, further comprising a second voltage detection device for detecting a voltage zero-crossing point for the power voltage as measured at to the load-side point and generating a second voltage zero-crossing signal to the control unit for generation of an updated time delay parameter indicative of the time lag, the updated time delay parameter being stored in the memory to replace the initial time delay parameter.

9. The relay control circuit as claimed in claim 8, wherein the second voltage detection device comprises a voltage detector connected across the load voltage and a voltage zero-crossing detector for detecting the voltage zero-crossing point of the voltage thereacross.

10. The relay control circuit as claimed in claim 6, wherein the time delay parameter storage means comprises:

a first memory unit for storing a mm-on time delay parameter corresponding in value to the time lag between a turn-on switch signal being sent to the coil of the relay and the contact of the relay closing in response; and, a second memory unit for storing a mm-off time delay parameter corresponding in value to the time lag between a turn-off switch signal being sent to the coil of the relay and the contact of the relay opening in response.

11. A relay control circuit for connecting a power source supplying an alternating current power voltage and a load the relay control circuit comprising:

a relay provided with a coil and at least one contact, the contact being operable between a closed position where the alternating current is allowed to pass to the load and an open position where the supply of the alternating current to the load is cut off, the contact being actuated responsive to energization of the coil, the relay having in operation at least one characteristic time lag;

a control unit operable to energize the coil of the relay responsive to a received turn-on or turn-off switch signal;

a time delay parameter storage means connected to the control unit and storing at least first and second time delay parameters corresponding in value to the time lag for first and second operational states of the relay;

a first voltage detection device for detecting a voltage zero-crossing point of the power voltage and generating a first voltage zero-crossing signal to the control unit; and, a current detection device for detecting a current zero-crossing point of the alternating current and generating a current zero-crossing signal to the control unit;

wherein the control unit is operable to control energization of the coil based upon the first time delay parameter to actuate a transition of the contact from the open position to the closed position in substantially time-aligned manner relative to the first voltage zero-crossing signal, whereby the contact is actually closed at a time that the power source voltage is substantially zero in value;

wherein the control unit is operable to control energization of the coil based upon the second time delay parameter to actuate a transition of the contact from the closed position to the open position in substantially time-aligned manner relative to the current zero-crossing signal, whereby the contact is actually opened at a time that the power source current is substantially zero in value: and, wherein the current detection device comprises:

a current detector connected in series between the power source and the load to detect the alternating current flowing from the power source to the load;

a comparator having a positive input and a negative input electrically connected across the current detector; and, a current zero-crossing circuit coupled to an output end of the comparator for generating the current zero-crossing signal to the control unit.

* * * * *